United States Patent
Yamashita et al.

[19]

[11] Patent Number: 5,845,486
[45] Date of Patent: Dec. 8, 1998

[54] INTERNAL COMBUSTION ENGINE EXHAUST GAS PURIFIER APPARATUS

[75] Inventors: Yukihiro Yamashita; Toshiki Matsumoto, both of Kariya, Japan

[73] Assignee: Nippondenso Co., Ltd., Kariya, Japan

[21] Appl. No.: 694,066

[22] Filed: Aug. 8, 1996

[30] Foreign Application Priority Data

Aug. 9, 1995 [JP] Japan .................................. 7-203033

[51] Int. Cl.$^6$ .................................................. F01N 3/20
[52] U.S. Cl. .............................. 60/274; 60/276; 60/284; 60/292; 60/324
[58] Field of Search .................... 60/276, 284, 285, 60/324, 274, 292, 286, 287; 123/676, 697

[56] References Cited

U.S. PATENT DOCUMENTS

| | | | |
|---|---|---|---|
| 5,184,463 | 2/1993 | Becker et al. | 60/284 |
| 5,279,117 | 1/1994 | Kaiser | 60/324 |
| 5,307,628 | 5/1994 | Castagne | 60/324 |
| 5,319,928 | 6/1994 | Bone et al. | 60/284 |
| 5,385,017 | 1/1995 | Harada | 60/284 |
| 5,410,876 | 5/1995 | Simko | 60/324 |
| 5,493,857 | 2/1996 | Komatsuda et al. | 60/324 |
| 5,566,546 | 10/1996 | Rumpsa et al. | 60/284 |
| 5,582,003 | 12/1996 | Patil et al. | 60/324 |
| 5,584,176 | 12/1996 | Meyer et al. | 60/284 |
| 5,613,360 | 3/1997 | Iwai et al. | 60/284 |

FOREIGN PATENT DOCUMENTS

| | | |
|---|---|---|
| A-60-88870 | 5/1985 | Japan . |
| U-62-173513 | 11/1987 | Japan . |
| A-6-193441 | 7/1994 | Japan . |
| A-7-127441 | 5/1995 | Japan . |
| A-7-158423 | 6/1995 | Japan . |

*Primary Examiner*—Willis R. Wolfe
*Attorney, Agent, or Firm*—Nixon & Vanderhye P.C.

[57] ABSTRACT

In order to activate an exhaust catalyst of an engine as quickly as possible from the engine restart, an exhaust damper for opening and closing an exhaust pipe is disposed downstream of a catalyst. A pneumatic actuator drives to open and close the exhaust damper. A negative pressure is introduced into a pressure chamber of the pneumatic actuator to close the exhaust damper after the engine is stopped. The closed exhaust damper keeps the warmth of the catalyst to ensure high exhaust gas purification performed when the engine is restarted. Alternatively, activation of the exhaust catalyst is enhanced by retarding the engine ignition timing and raising the engine idling speed.

16 Claims, 13 Drawing Sheets

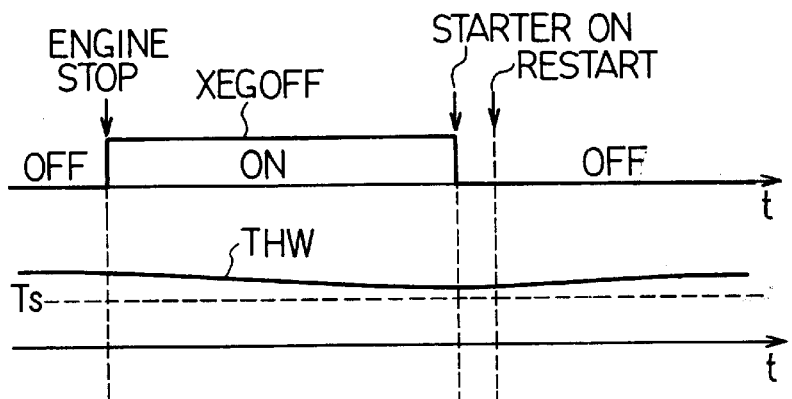
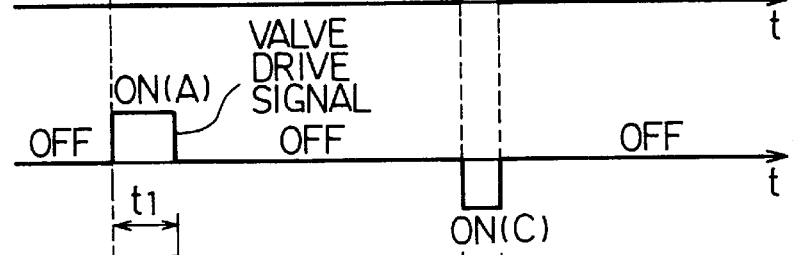
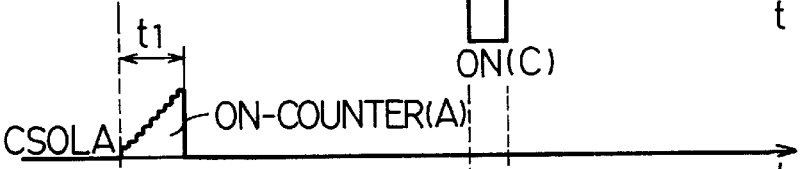
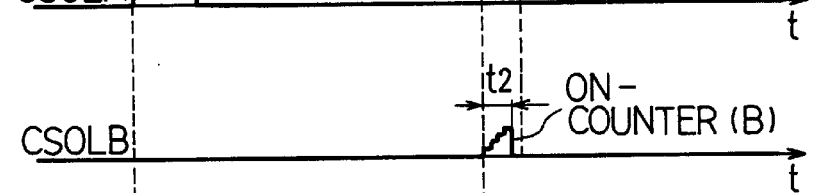
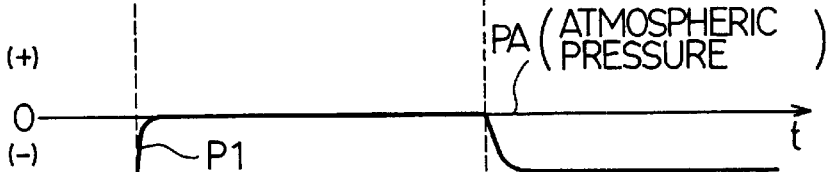
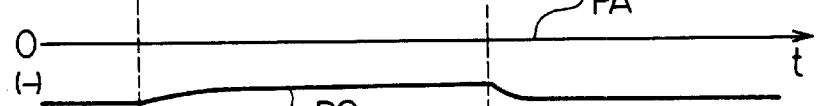
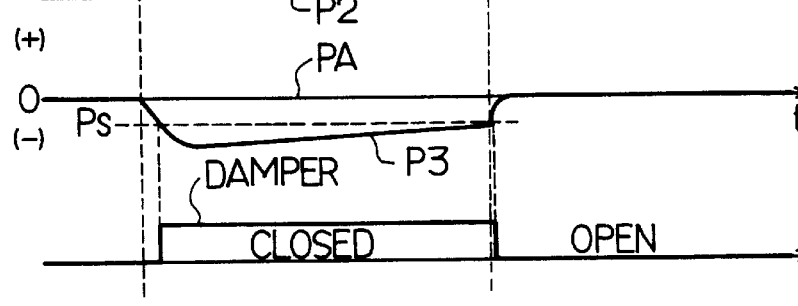

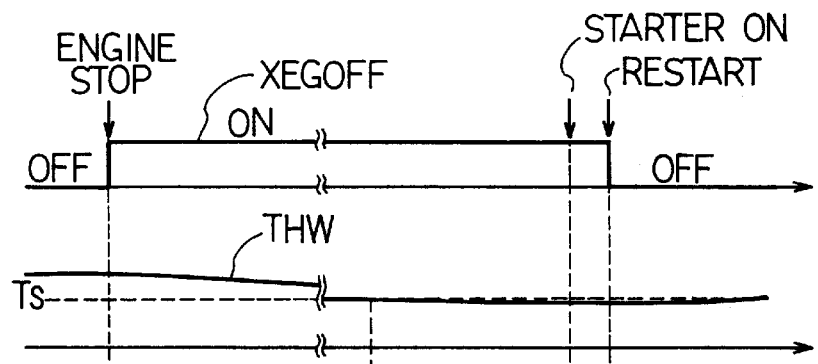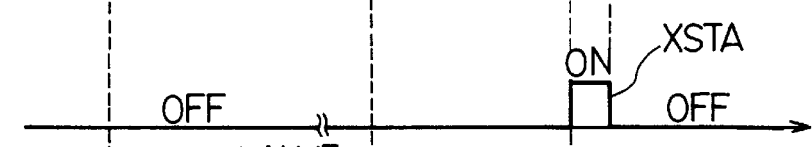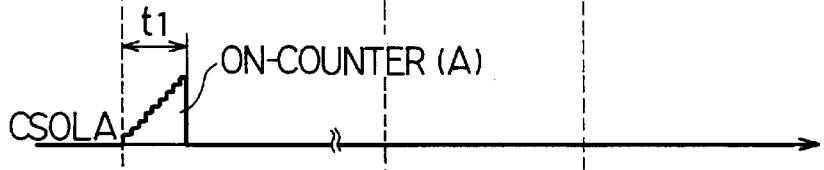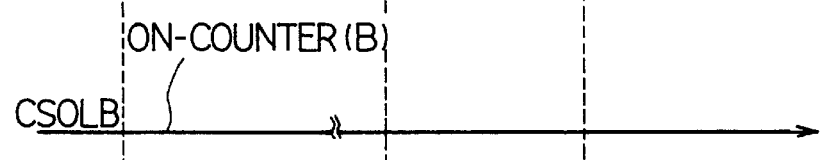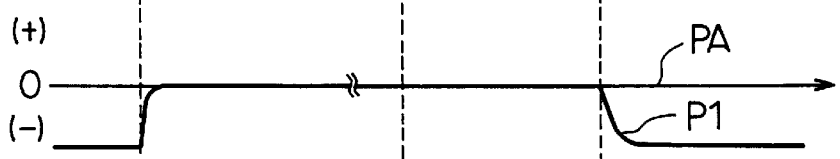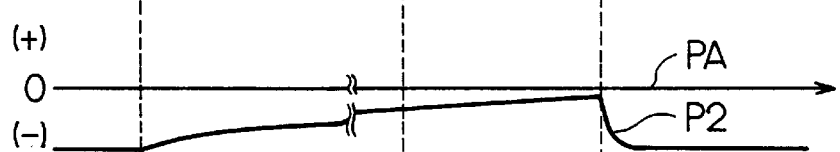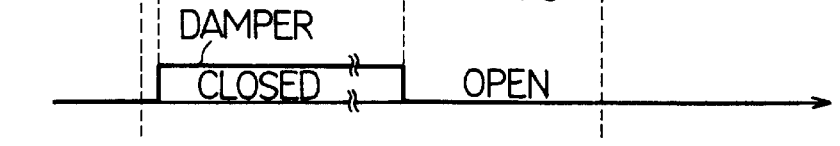

INTERNAL COMBUSTION ENGINE EXHAUST GAS PURIFIER APPARATUS

BACKGROUND OF THE INVENTION

1. Field of the invention

The present invention relates to an internal combustion engine exhaust gas purifier apparatus that causes the temperature of an exhaust gas purifying catalyst to reach an activation temperature soon after the internal combustion engine is started.

2. Description of Related Art

For three-way catalysts installed in motor vehicles to effectively perform exhaust gas purification, the temperature of the catalyst needs to be increased to the activation temperature (normally, 300°–350° C.). Until the catalyst temperature reaches the activation temperature after the engine is started, the exhaust gas purification capacity of the catalyst remains low letting out large amounts of harmful exhaust gas components (HC, CO, NOx). The emission quality thus deteriorates. To cope with this problem, a technology has lately been developed which warms up the catalyst soon after the engine is started, by performing catalyst early warm-up control when the engine coolant temperature is low at the time of start of the engine. An example of the catalyst early warm-up control helping the catalyst temperature to quickly reach the activation temperature is by delaying the engine ignition timing and, simultaneously, increasing the engine idle speed, as described in, for example, Japanese patent application laid-open No. SHO 60-88870.

After the engine is stopped, the catalyst and the coolant become cool and releasing heat. Because of their different heat capacities and heat releasing characteristics, the catalyst and the coolant cool at different rates; that is, the catalyst cools faster than the engine coolant. Therefore, a state where the catalyst has cooled down while the engine coolant temperature is still high occurs depending on the elapsed time following the stop of the engine. If a conventional catalyst early warm-up control based on the engine coolant temperature is operated in the above-described state, the catalyst early warm-up operation will not be performed even though the catalyst is cold, thus requiring a long time for the catalyst to reach the activation temperature. The conventional art thus encounters problems in that during a certain period following the restart of the engine, harmful exhaust gas components will not be purified sufficiently.

SUMMARY OF THE INVENTION

The present invention has been made considering the above-stated problems. An object of the invention is to provide an internal combustion engine exhaust gas purifier apparatus that reduces the emission of harmful exhaust gas components immediately after the engine is started.

According to a first aspect of the invention, there is provided an exhaust gas purifying apparatus for an internal combustion engine which has an exhaust damper provided in an exhaust passage, in at least one of an upstream passage portion and a downstream passage portion from a catalyst, for opening and closing the exhaust passage, and drive mechanism for closing the exhaust damper under predetermined conditions after the engine has stopped.

The catalyst cools relatively fast after the engine has stopped, because the catalyst has less heat capacity than the engine and, in addition, because air coming in from the outside through the exhaust passage promotes heat release from the catalyst. Therefore, the heat release from the catalyst can be reduced by blocking the external air flow through the exhaust passage by using the exhaust damper for closing an upstream passage portion or a downstream passage portion from the catalyst, or both passage portions. The cooling rate of the catalyst is thereby reduced so that the catalyst remains at relatively high temperature for a long period. If the engine is restarted within a certain period following the stop of the engine, the catalyst will soon reach the activation temperature and, therefore, perform efficient exhaust gas purification immediately after the restart of the engine.

According to a second aspect of the invention, catalyst temperature is determined directly or indirectly and on the basis of the determined catalyst temperature it is determined whether to perform the catalyst early warm-up control for quickly increasing the catalyst temperature after the engine is started. Thereby, if the catalyst is cold at the time of restart of the engine, the conditions for performing the catalyst early warm-up control are established so that the catalyst early warm-up is actually performed regardless of whether the engine coolant temperature is high or low.

BRIEF DESCRIPTION OF THE DRAWINGS

The foregoing and further objects, features and advantages of the present invention will become apparent from the following description of preferred embodiments when read with reference to the accompanying drawings, wherein:

FIGS. 4A–4J show timing charts indicating the operation of various parts in a case where the engine is stopped for a short time and then restarted;

FIGS. 5A–5J show timing charts indicating the operation of various parts in a case where the engine is stopped for a long time and then restarted;

DETAILED DESCRIPTION OF PRESENTLY PREFERRED EMBODIMENTS

Figure 1:
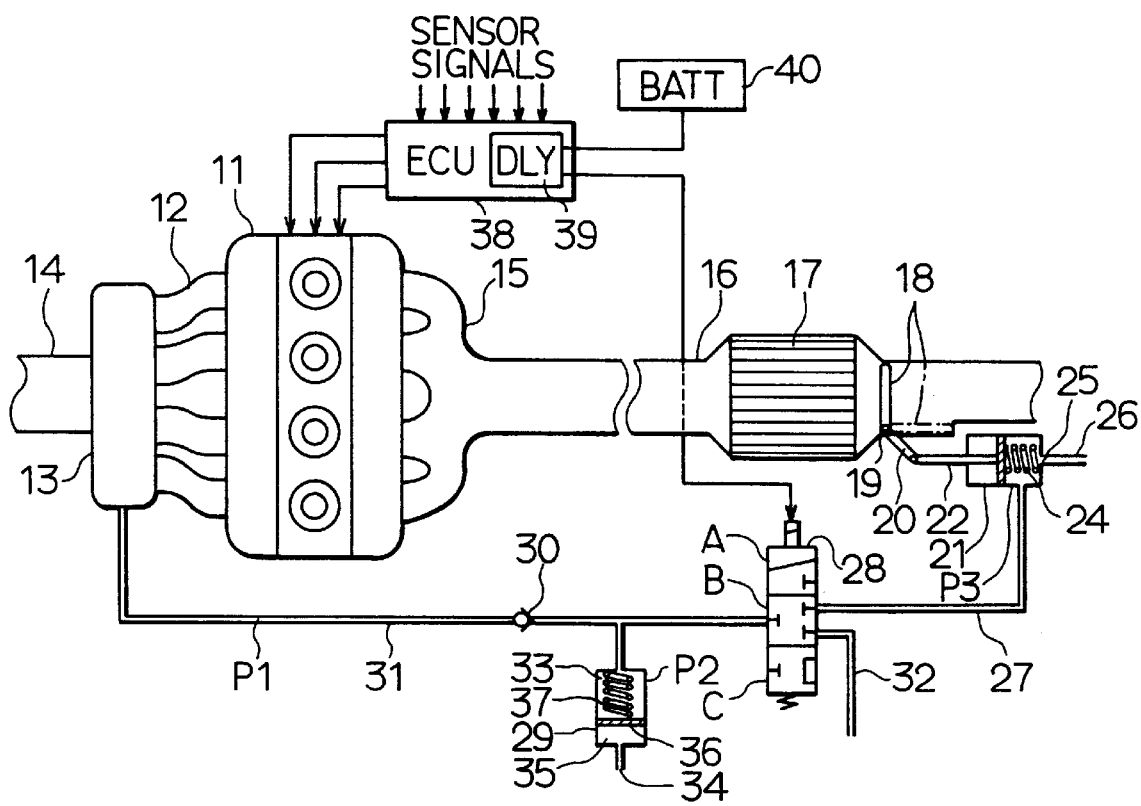
FIG. 1 schematically illustrates the entire system of a first embodiment of the present invention.

A first embodiment of the present invention will be described hereinafter with reference to FIGS. 1 to 5. The overall system construction will first be described with reference to FIG. 1. An intake manifold 12 connected to the intake side of an internal combustion engine 11 is connected to an the intake pipe 14 by a surge tank 13. An exhaust pipe 16 is connected to the exhaust side of the engine 11 by an exhaust manifold 15, thus forming an exhaust passage. A catalyst 17 for purifying exhaust gas, such as a three-way catalyst, is disposed half way of the exhaust pipe 16.

Figure 2:
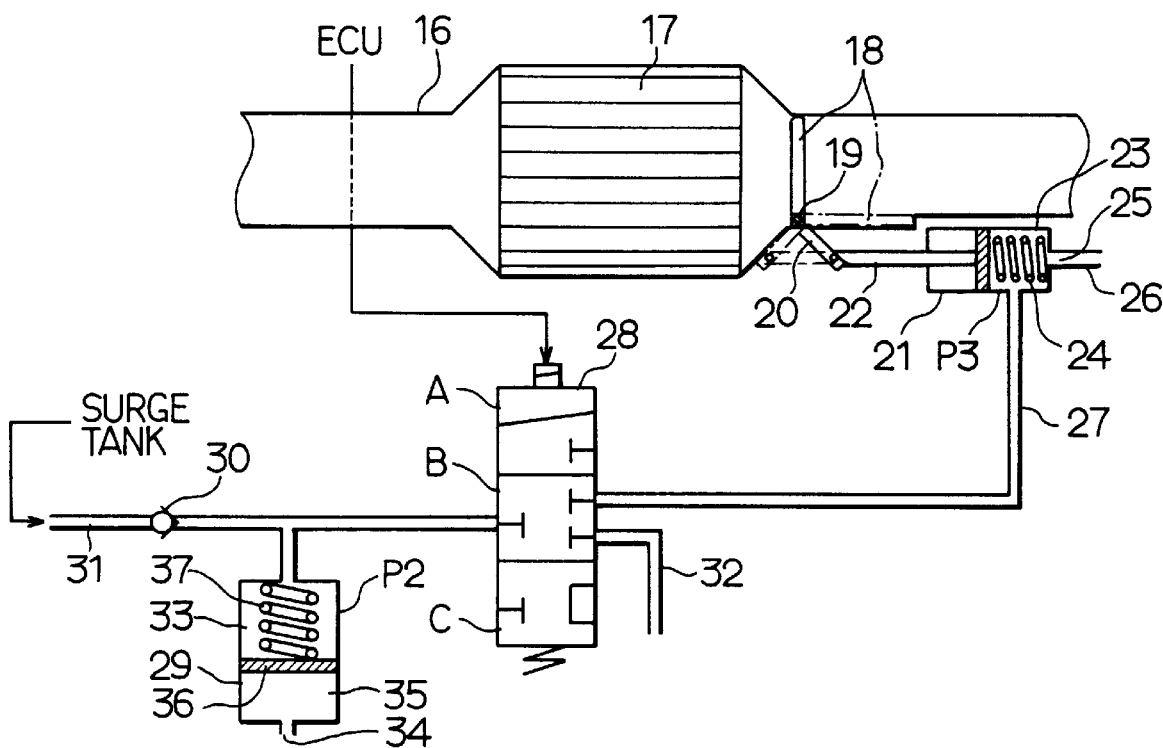
FIG. 2 illustrates portions of the embodiment shown in FIG. 1.

Provided downstream of the catalyst 17 is an exhaust damper 18 as an exhaust damper for opening and closing the exhaust pipe 16. The exhaust damper 18 is pivotably connected to the exhaust pipe 16 by a shaft 19. A link mechanism 20 for opening and closing the exhaust damper 18 is connected to a rod 22 of a pneumatic actuator 21 provided as a drive means. The exhaust damper 18 is opened and closed by the projecting and receding motion of the rod 22. As shown in FIG. 2, a spring 24 is disposed in a pressure chamber 23 on which the air pressure P3 (negative pressure) of the pneumatic actuator 21 acts. The rod 22 is pushed out or pulled in depending on the magnitude relation between the air pressure P3 and the spring force (elastic restoration force) of the spring 24.

The pressure chamber 23 of the pneumatic actuator 21 is connected to the surge tank 13 of the intake pipe 14, which is a negative pressure source, via a pressure introduction pipe 27, an electromagnetic valve 28, an accumulator (air pressure accumulating device) 29, a check valve 30, and a pressure introduction pipe 31, as shown in FIG. 1. Thereby the intake negative pressure for the engine 11 is introduced into the pressure chamber 23 of the pneumatic actuator 21. The pressure chamber 23 is also connected to an atmospheric air introduction pipe 26 for introducing atmospheric air into the pressure chamber 23 through a small orifice 25 provided as an operating pressure attenuating means, as shown in FIG. 2. With the small orifice 25 permitting gradual pressure leakage, the air pressure (negative pressure) in the pressure chamber 23 attenuates.

The electromagnetic valve 28 is a three-port three-position valve that communicates the pressure introduction pipes 27, 31 with each other and closes an atmosphere communication pipe 32 in valve position A, and closes all of the pressure introduction pipes 27, 31 and the atmosphere communication pipe 32 in valve position B, and closes the pressure introduction pipe 31 and communicates the pressure introduction pipe 27 with the atmosphere communication pipe 32 in valve position C. In the off state where the electromagnetic valve 28 is not energized, the valve 28 assumes the valve position B to close the pressure introduction pipe 27,31 and the atmosphere communication pipe 32. The accumulator 29 comprises a slidable pressure partition 36 that separates a pressure accumulation chamber 33 communicatable with the pressure introduction pipe 27 from an atmosphere communication chamber 35 communicated with the atmosphere through an atmosphere communicating hole 34. Thus, an air pressure (suction negative pressure) P2 matching the spring force of a return spring 37 is stored in the pressure accumulation chamber 33 of the accumulator 29.

An electronic control unit (hereinafter, referred to as "ECU") 38 shown in FIG. 1 performs fuel injection control and ignition control, and switches the electromagnetic valve 28 to one of the positions A, B, C. The ECU 38 includes a delay circuit (DLY) 39 for driving the electromagnetic valve 28 after the engine stops. The ECU 38 receives power from a battery 40 through the delay circuit 39 until a predetermined length of time elapses after the stop of the engine.

The ECU 38 turns on and off the electromagnetic valve 28 to close and open the exhaust damper 18, on the basis of various sensors (not shown) for detecting engine operation parameters such as engine speed, coolant temperature, intake air flow, etc.

For example, where the engine 11 is stopped after the engine 11 has been sufficiently warmed up and the catalyst 17 has been completely activated, and the engine 11 is then restarted after a short time (about one hour). In such a case, at the time of restarting the engine 11, it can normally happen that the engine 11 still remains in the warm state but the catalyst 17 has cooled down as low as or lower than an activation temperature (generally 300°–350° C.). This is because the catalyst 17 has a smaller heat capacity than the engine 11 and because atmospheric air flows to the catalyst 17 through the exhaust manifold 15 provided upstream of the catalyst 17 and the downstream exhaust pipe 16, thus promoting heat release from catalyst 17. Therefore, by closing the exhaust damper 18 to block the flow of atmospheric air to the catalyst 17, the heat release from the catalyst 17 will be reduced. That is, the cooling rate of the catalyst 17 will be reduced, so that the catalyst temperature will remain relatively high for a relatively long time after the stopping of the engine 11. According to the embodiment, if the engine is restarted within a relatively short time after the engine has stopped, the catalyst 17 will soon reach an activation temperature, thus performing good exhaust gas purification immediately after restart of the engine 11.

During the engine operation before an engine stoppage, the electromagnetic valve 28 remains off and assumes the valve position B closing the pressure introduction pipes 27, 31 and the atmosphere communication pipe 32. In this state, due to the air pressure (negative pressure) P1 in the pressure introduction pipe 27 communicated with the surge tank 13 of the intake pipe 14, an air pressure P2 (=P1) matching the elastic restoration force of the return spring 37 is accumulated in the pressure accumulation chamber 33. The air pressure P3 in the pressure chamber 23 of the pneumatic actuator 21 remains equal to the atmospheric pressure, so that the rod 22 is projected by the spring force of the spring 24 to maintain the exhaust damper 18 in the open position by means of the link mechanism 20.

When the engine 11 is stopped, the ECU 38 outputs a closure instruction signal to turn on the electromagnetic valve 28 to hold the valve 28 in the position A for a predetermined length of time (several seconds). When the electromagnetic valve 28 is in the valve position A, the accumulator 29 is communicated with the pneumatic actuator 21 through the pressure introduction pipe 27, and the pressure P2 accumulated in the accumulator 29 is introduced into the pressure chamber 23 of the pneumatic actuator 21. The air pressure P3 (=P2)in the pressure chamber 23 overcomes the spring force of the spring 24 to withdraw the rod 22, thus maintaining the exhaust damper 18 in the closed position by means of the link mechanism 20. The electromagnetic valve 28 is returned to the off state after the foregoing predetermined length of time (several seconds) elapses. However, the exhaust damper 18 is maintained in the closed position until the air pressure P3 in the pressure chamber 23 becomes less than the force of the spring 24 owing to the gradual pressure leakage through the small orifice 25.

When the engine 11 is restarted with the exhaust damper 18 closed by the pneumatic actuator 21 after a short period of engine stop, the electromagnetic valve 28 simultaneously turned on for a predetermined length of time to switch the valve 28 to the position C. Thereby, the pressure chamber 23 of the pneumatic actuator 21 becomes communicated with the atmosphere communication pipe 32 through the pressure introduction pipe 27 so that the atmospheric air immediately flows into the pressure chamber 23, equalizing the air pressure P3 in the pressure chamber 23 to the atmospheric pressure. The rod 22 is thus projected by the force of the spring 24 of the pneumatic actuator 21 to switch the exhaust damper 18 to the open position shown by a dot-chain line in FIGS. 1 and 2.

If an engine stoppage lasts for a long time before restart of the engine so that the catalyst 17 has become cold, there is no more need to close the exhaust damper 18 (maintain the warmth of the catalyst 17). Therefore, while the exhaust damper 18 is closed, gradual leakage of the air pressure P3 in the pressure chamber 23 of the pneumatic actuator 21 is allowed through the small orifice 25 to gradually attenuate the air pressure P3. With the pressure leakage through the small orifice 25, the air pressure P3 in the pressure chamber 23 becomes less than the spring force of the spring 24 after elapse of a time approximately equal to the time required for decrease of the temperature of the catalyst 17 to a predetermined temperature. The exhaust damper 18 is thereby returned to the open position by the spring force of the spring 24. The spring force of the spring 24, the capacity of the pressure chamber 23, the aperture diameter of the small orifice 25 and the like are predetermined so as to realize the above-described closure action of the exhaust damper 18.

The control of the action of the exhaust damper 18 by the ECU 38 will be described with reference to FIG. 3. In step 101, the ECU 38 reads in signals from various sensors for detecting operating conditions such as engine speed NE, intake air flow QN, intake pipe pressure PM, throttle opening TA, coolant temperature THW, etc. Then, step 102 determines whether the catalyst is activated, depending on whether or not the coolant temperature THW equals or exceeds a predetermined temperature Ts. If the coolant temperature THW is lower than the predetermined temperature Ts, the routine ends without performing the other procedure because the low temperature of the catalyst 17 eliminates the need to close the exhaust damper 18 (maintain the warmth of the catalyst 17). The step 102 functions as an activation determining means.

Conversely, if step 102 determines that the coolant temperature THW is equal to or higher than the predetermined temperature Ts, which means that the catalyst temperature is sufficiently high, the operation proceeds to step 103 to check whether a starter flag XSTA is ON (indicating that the starting operation is in progress). If the flag starter flag XSTA is OFF, the operation proceeds to step 104 to check whether an engine stoppage flag XEGOFF is ON (indicating that the engine is stopped). If the stoppage flag XEGOFF is OFF, the operation proceeds to step 107 to maintain the electromagnetic valve 28 in the off state to keep the valve position B so that pressure introduction pipe 27,31 and the atmosphere communication pipe 32 are closed. Under this condition, the air pressure P3 in the pressure chamber 23 of the pneumatic actuator 21 equals the atmospheric pressure and, therefore, the rod 22 is projected by the spring force of the spring 24 to hold the exhaust damper 18 in the opened position.

Conversely, if the engine stoppage flag XEGOFF is ON (indicating an engine stoppage), the operation proceeds to step 105 to determine whether the count value CSOLA of an electromagnetic valve ON counter (A) indicates an elapsed time less than a predetermined length of time t1. If the counter value CSOLA indicates an elapsed time less than the predetermined length of time t1, the operation proceeds to step 106 to maintain the electromagnetic valve 28 in the on state to hold the valve position A. When the electromagnetic valve 28 is in the valve position A, the accumulator 29 and the pneumatic actuator 21 are communicated with each other through the pressure introduction pipe 27 so that the pressure P2 accumulated in the accumulator 29 is introduced into the pressure chamber 23 of the pneumatic actuator 21 to hold the exhaust damper 18 in the closed position.

When the predetermined length of time t1 elapses, the operation proceeds to step 107 to turn off the electromagnetic valve 28 to switch the valve 28 to the position B so that the pressure introduction pipe 27, 31 and the atmosphere communication pipe 32 are closed. While the exhaust damper 18 continues to be held in the closed position, atmospheric air is gradually sucked into the pressure chamber 23 of the pneumatic actuator 21 through the small orifice 25, gradually attenuating the air pressure P3 in the pressure chamber 23. After the elapse of a time approximately equal to the time required for temperature decrease of the catalyst 17 to a predetermined temperature, the air pressure P3 in the pressure chamber 3 becomes less than the spring force of the spring 24 so that the exhaust damper 18 is returned to the opened state by the spring force of the spring 24.

Conversely, if step 103 determines that the starter flag XSTA is ON (the engine starting operation is in progress), the operation proceeds to step 108 to determine whether the count value CSOLB of an electromagnetic valve ON counter (B) indicates an elapsed time less than a predetermined length of time t2. If the counter value CSOLB indicates an elapsed time less than the predetermined length of time t2, the operation proceeds to step 109 to turn on the electromagnetic valve 28 to switch to the valve position C and hold the valve 28 in the position C. In the valve position C, the pneumatic actuator 21 and the pressure chamber 23 are communicated with the atmosphere communication pipe 32.

When the predetermined length of time t2 elapses, the operation proceeds to step 110 to turn off the electromagnetic valve 28 to switch to the valve position B so that the pressure introduction pipe 27, 31 and the atmosphere communication pipe 32 are closed. Owing to the air pressure (negative pressure) P1 in the pressure introduction pipe 27 communicated with the surge tank 13 of the intake pipe 14, the air pressure P2 (=P1) matching the spring force of the return spring 37 is accumulated in the pressure accumulation chamber 33 of the accumulator 29. In the meantime, the exhaust damper 18 is maintained in the open position.

Figure 3:
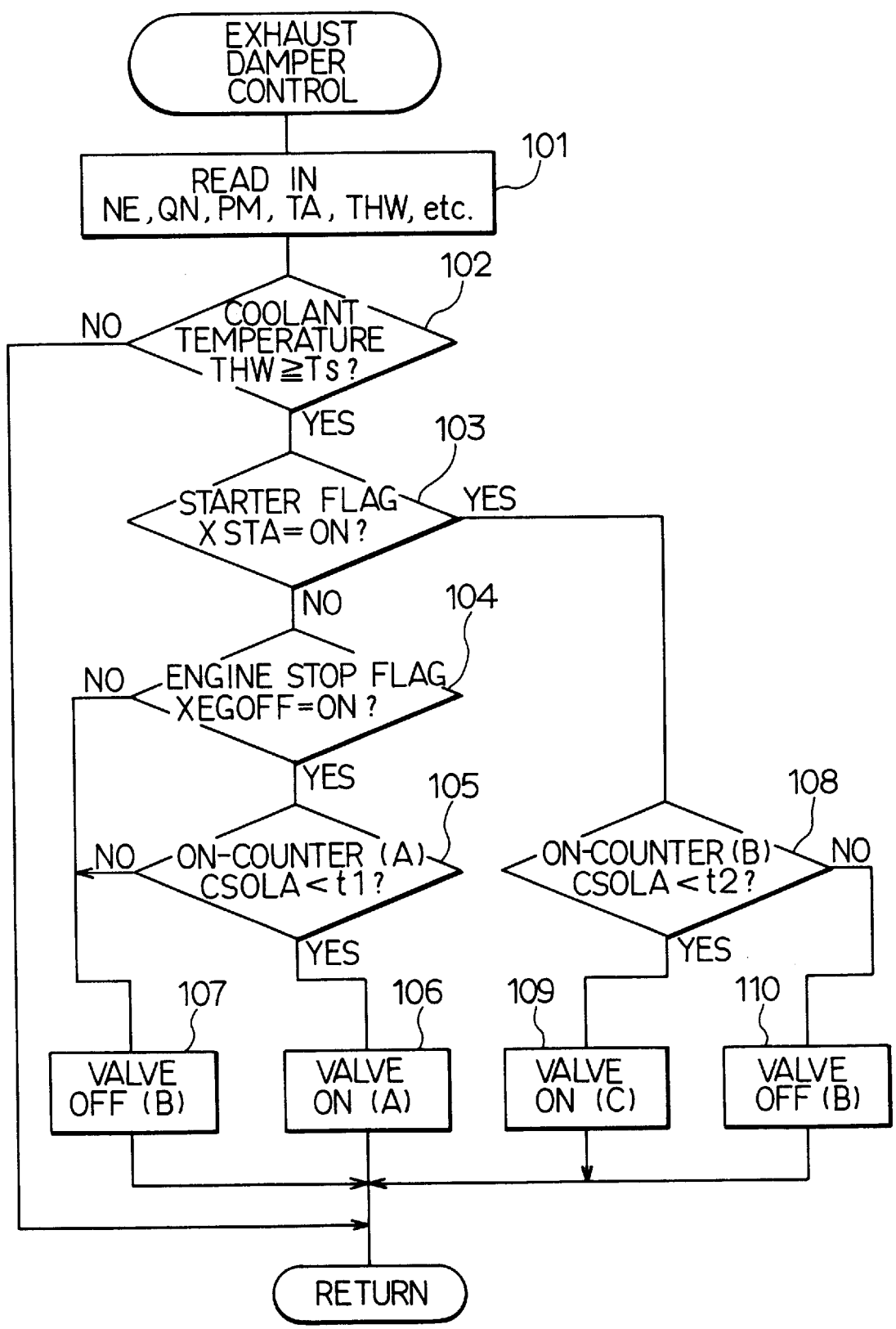
FIG. 3 is a flowchart illustrating the exhaust damper action control routine.
Figure 6:
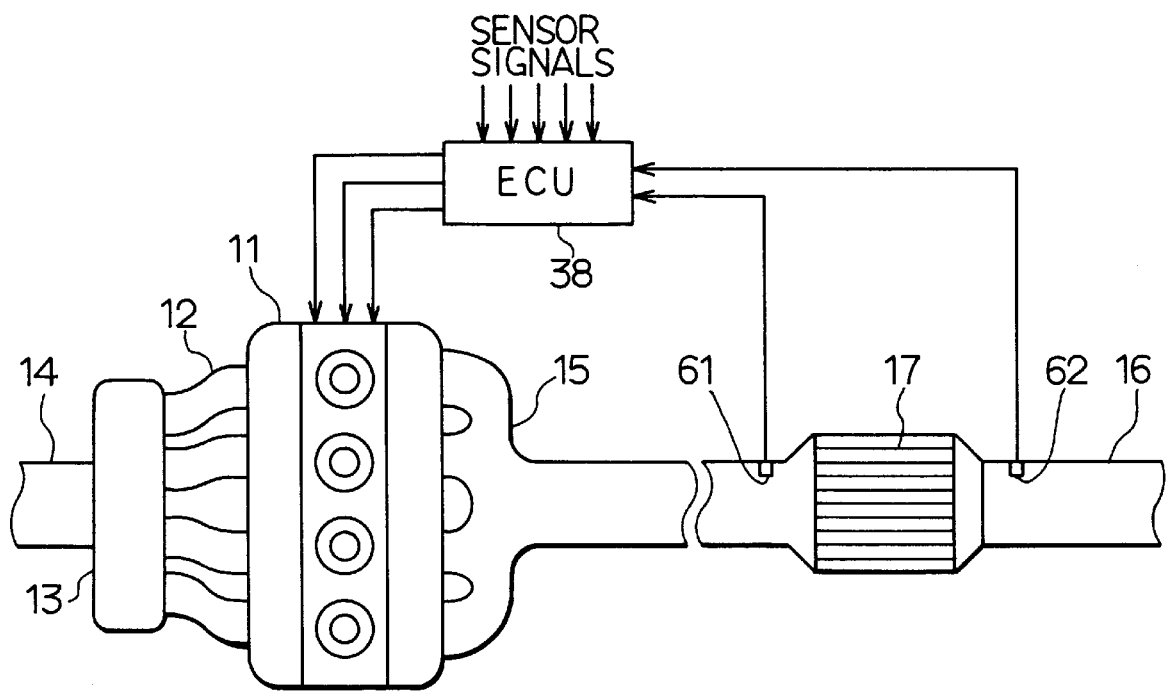
FIG. 6 schematically illustrates the entire system of a second embodiment of the invention.

FIGS. 4A–4J and 5A–5J show the timing charts indicating the exhaust damper action control illustrated in FIG. 3. The timing charts of FIGS. 4A–4J indicate the operation performed when the engine 11 is restarted with the exhaust damper 18 closed after a short period of engine stoppage. The timing charts of FIG. 5 indicates the operation performed when the engine 11 is restarted with the exhaust damper 18 opened after a long period of engine stoppage.

In either one of the operations indicated in FIGS. 4A–4J and 5A–5J, an engine stop is immediately followed by the turning on of the electromagnetic valve 28. The valve 28 is thus switched to the valve position A, so that the pressure P3 in the pneumatic actuator 21 decreases to close the exhaust damper 18, thereby keeping the heat of the catalyst 17. Simultaneously with the turning on of the electromagnetic valve 28, the electromagnetic valve ON counter (A) starts to count. When the count value CSOLA comes to indicate the predetermined length of time t1, the electromagnetic valve 28 is turned off. While the exhaust damper 18 continues to be held in the closed position, atmospheric air is gradually sucked into the pressure chamber 23 of the pneumatic actuator 21 through the small orifice 25, gradually attenuating the pressure P3. The exhaust damper 18 is held in the closed position as long as the pressure P3 is greater than the spring force of the spring 24.

In the case as indicated in FIGS. 4A–4J where the engine 11 is restarted with the exhaust damper 18 closed after a short engine stoppage, immediately after the restart operation switches the starter flag XSTA to the on status, the pressure P3 in the pneumatic actuator 21 instantly becomes equal to the atmospheric pressure (PA), thus opening the exhaust damper 18.

On the other hand, in the case as indicated in FIGS. 5A–5J where the engine 11 is stopped for a long time before being restarted, the pressure leakage through the small orifice 25 reduces the pressure P3 in the pneumatic actuator 21 to a level less than the spring force of the spring 24, thus opening the exhaust damper 18, prior to restart of the engine 11. Since the exhaust damper 18 is opened by the time of restart of the engine 11, the exhaust damper 18 is simply maintained in the open position after the restart.

As described above, the first embodiment reduces the heat release from the catalyst 17 by closing the exhaust damper 18 to block the flow of external air into or through the exhaust pipe 16 immediately after the engine 11 is stopped. The cooling rate of the catalyst 17 is thereby reduced so that the catalyst temperature remains relatively high for a long time after the engine 11 is stopped. Therefore, if the engine 11 is restarted a relatively short time after the engine 11 is stopped, the catalyst 17 soon reaches an activation temperature, thus performing good exhaust gas purification immediately after the restart. The embodiment thus reduces harmful exhaust gas components immediately after the starting of an engine.

In addition, the pneumatic actuator 21 for driving the exhaust damper 18 generates the drive force in the closing direction by using the air pressure P3, and the drive force in the opening direction by using the spring force of the spring 24. The air pressure P3 is gradually attenuated by the small orifice 25 of the pneumatic actuator 21 while the exhaust damper 18 is closed. When the air pressure P3 becomes less than the spring force of the spring 24, the exhaust damper 18 is automatically opened by the spring force of the spring 24. Thus, the embodiment automatically opens the exhaust damper 18 by the spring force of the spring 24 and, reliably performs the opening of the exhaust damper 18 by the spring force of the spring 24 even if a failure occurs in an electric system, thus improving the fail-safe characteristics.

Instead of the pneumatic pressure, hydraulic pressure may be employed as the pressure source. In addition, a motor, an electromagnet or other drive force sources may instead be used as the drive means for driving the exhaust damper 18. In such a case, a timer may be used to measure the time of closure of the exhaust damper 18 so that the exhaust damper 18 can be opened by a motor, an electromagnet or the like when a predetermined length of time has elapsed.

According to the first embodiment, if the coolant temperature THW is less than the predetermined temperature Ts, that is, if the catalyst 17 is so cold that it is no use keeping the heat or warmth of the catalyst 17, then the exhaust damper 18 is not closed after the engine is stopped, to reduce power consumption after the stopping of the engine. However, according to the present invention, the exhaust damper 18 may be always closed after an engine stoppage regardless of the temperature of the catalyst 17. Such a construction still achieves the objects of the invention.

In addition, the first embodiment automatically opens the exhaust damper 18 if the exhaust damper 18 has been closed for a relatively long time, in order to prevent the exhaust damper 18 from impeding the flow of exhaust gas at the time of restart of the engine. However, according to the present invention, the exhaust damper may be held in the closed position during the entire period of a stoppage of the engine, and may be opened at the time of restart of the engine. Such a construction still achieves the objects of the invention.

Further, according to the first embodiment, since the exhaust damper 18 is disposed downstream of the catalyst 17, the exhaust damper 18 blocks external air flows from the outlet opening of the exhaust pipe 16 toward the catalyst 17, thus improving the characteristics of keeping the warmth of the catalyst 17. However, since external air also flows into the exhaust pipe 16 by a route from the intake pipe 14, the intake manifold 12, the engine 11 to the exhaust manifold 15, the exhaust damper 18 may be disposed upstream of the catalyst 17 instead, reducing the heat release from the catalyst 17 after the engine is stopped. If the exhaust damper 18 is provided on each of the upstream and downstream sides of the catalyst 17, the catalyst warmth keeping characteristics will be further improved.

Second Embodiment

FIGS. 6 to 19 illustrate a second embodiment of the invention. According to the second embodiment, an air-fuel ratio sensor 61 that outputs a linear signal in accordance with the air-fuel ratio of air-fuel mixture which is represented by the exhaust gas is disposed upstream of a catalyst 17. An oxygen sensor 62 that detects whether the air-fuel ratio of mixture is rich or lean is disposed downstream of the catalyst 17. An ECU 38 performs feedback control of air-fuel ratio so as to reduce the difference between a target air-fuel ratio and an actual air-fuel ratio on the basis of the output from the air-fuel ratio sensor 61 upstream of the catalyst 17. The ECU 38 also corrects the target air-fuel ratio on the basis of the output from the oxygen sensor 62 downstream of the catalyst 17.

The ECU 38 also functions as a catalyst early warm-up means. The ECU 38 increases the exhaust gas temperature to quickly increase the catalyst temperature to an activation temperature at the start of the engine 11, by delaying the ignition timing of the engine 11 and simultaneously increasing the engine idle speed.

Furthermore, the ECU 38 functions as a catalyst temperature detecting means for detecting a catalyst temperature, and functions as a deciding means for deciding whether to perform the catalyst early warm-up control on the basis of the detected catalyst temperature.

Two different methods of determining the catalyst temperature will be described below.

Figure 7:
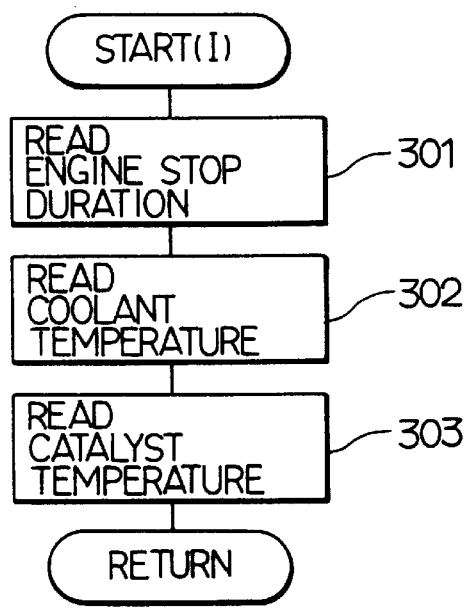
FIG. 7 is a flowchart illustrating the operation according to catalyst temperature determining method I.
Figure 8:
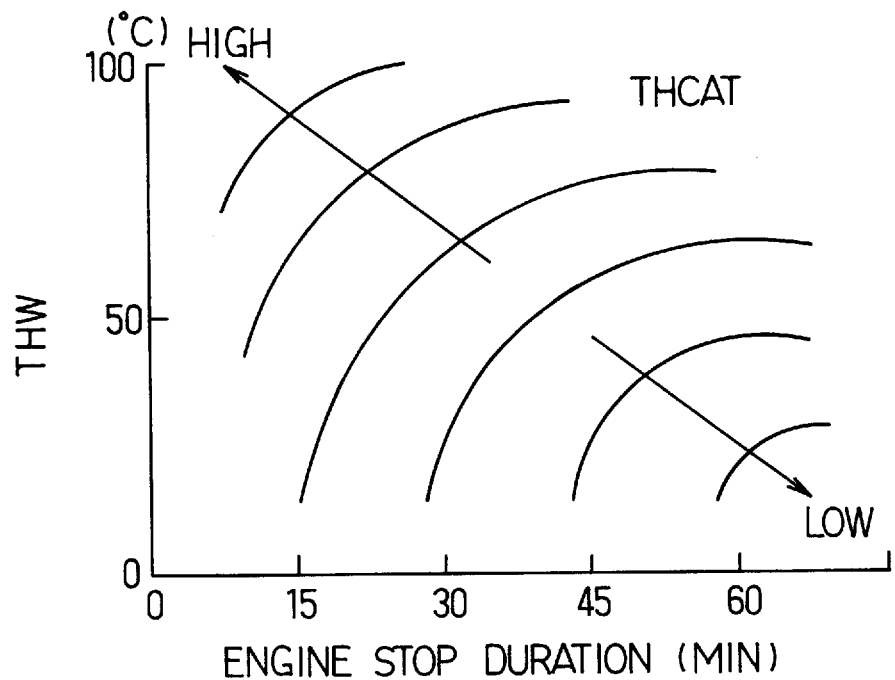
FIG. 8 is a characteristic graph indicating the relationship among the engine stop duration, the coolant temperature and the catalyst temperature.
Figure 9:
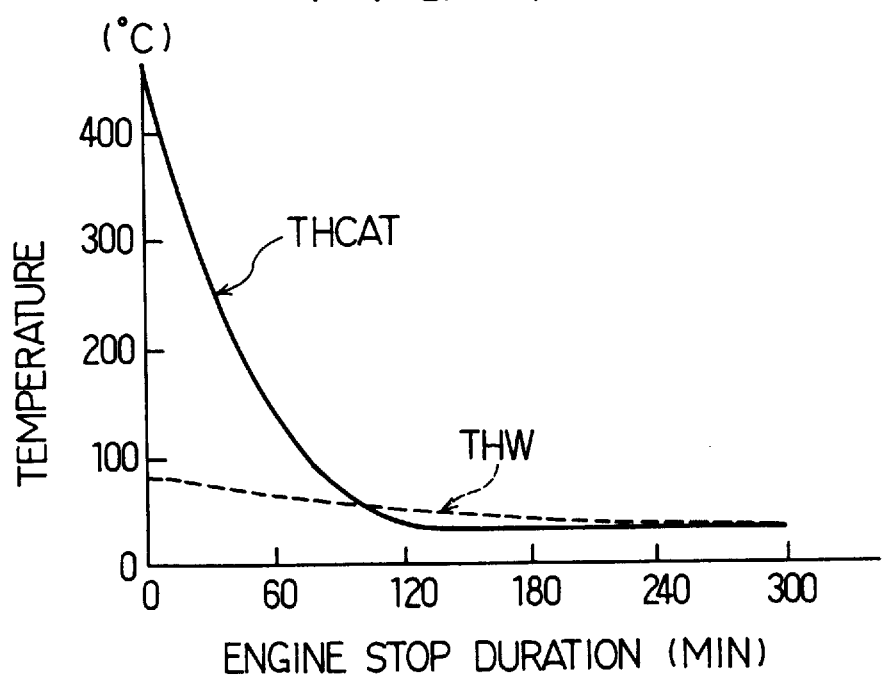
FIG. 9 is a graph indicating the changes of the coolant temperature and the catalyst temperature over time after the engine is stopped.

A catalyst temperature determining method I as illustrated in FIG. 7 estimates a catalyst temperature from the duration of engine stoppage and the engine coolant temperature, utilizing the characteristic as indicated in FIG. 9 where the engine coolant temperature and the catalyst temperature change over time during a period of engine stoppage. First, step 301 reads an engine stoppage duration. Step 302 then reads an engine coolant temperature THW. Step 303 determines a catalyst temperature THCAT in accordance with the engine coolant temperature and the engine stoppage duration, using a map indicated in FIG. 8.

Figure 10:
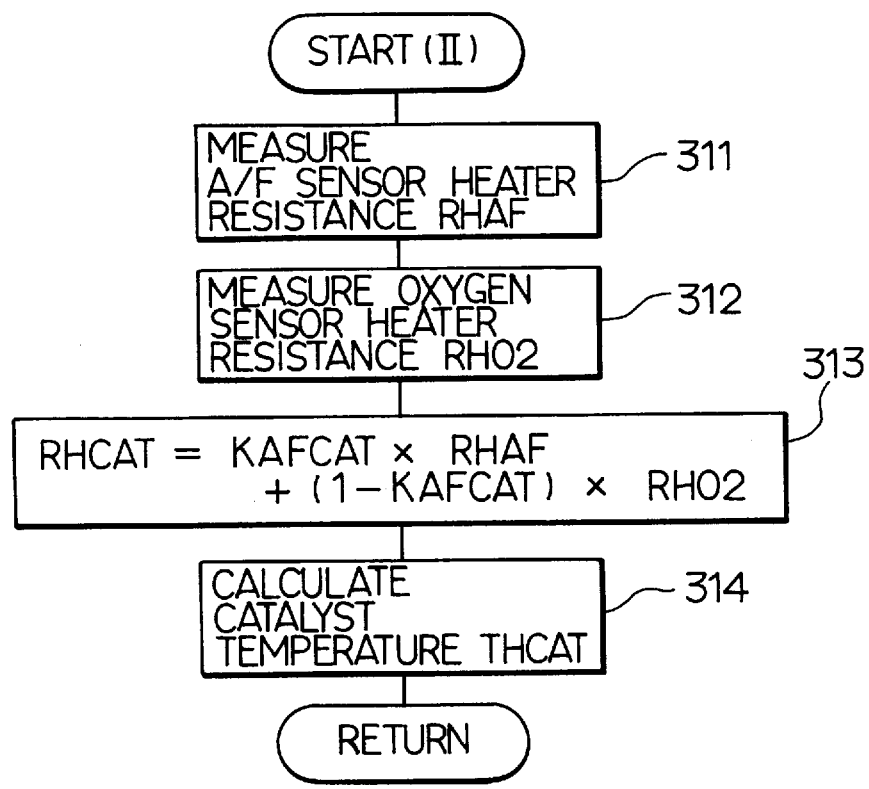
FIG. 10 is a flowchart illustrating the operation according to catalyst temperature determining method II.
Figure 12:
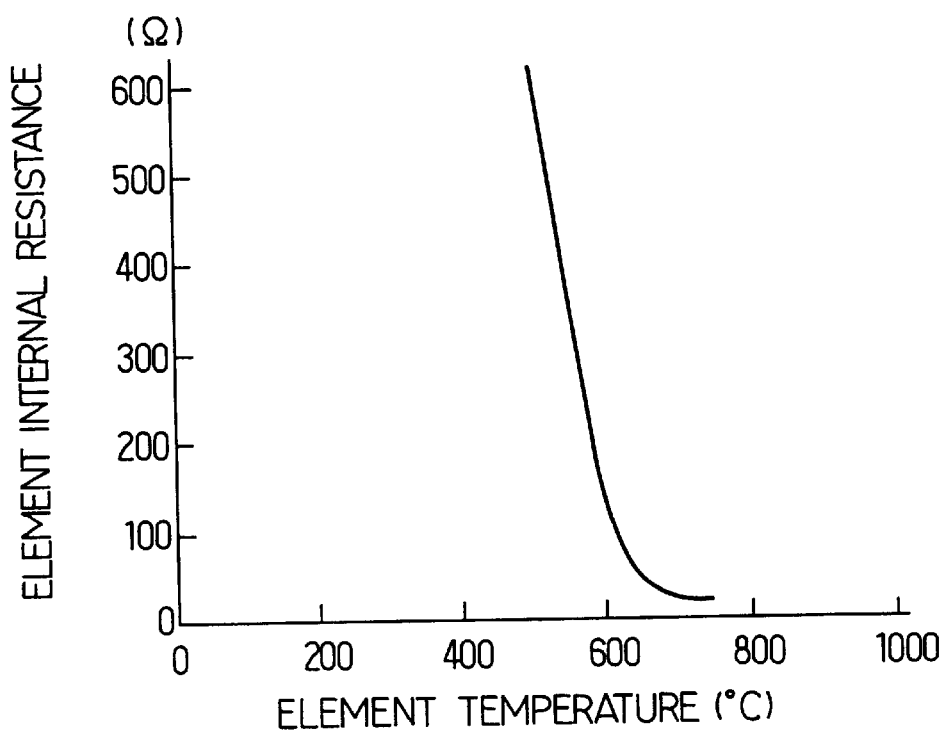
FIG. 12 is a characteristic graph indicating the relationship between the temperature and the element internal resistance of the air-fuel ratio sensor element.
Figure 13:
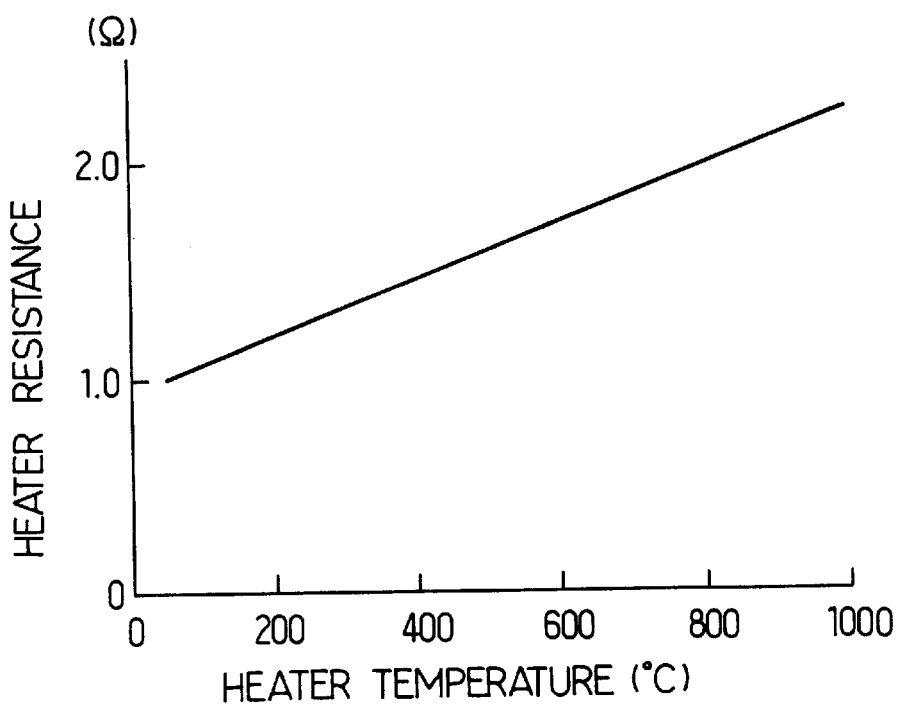
FIG. 13 is a characteristic graph indicating the relationship between the heater temperature and the heater resistance of the air-fuel ratio sensor.

A catalyst temperature determining method II as illustrated in FIG. 10 estimates a catalyst temperature from the element temperatures or heater temperatures of the air-fuel ratio sensor 61 upstream of the catalyst 17 and the oxygen sensor 62 downstream of the catalyst 17. More specifically, the method utilizes a fact that the element temperatures and heater temperatures of the air-fuel ratio sensor 61 and the oxygen sensor 62 disposed near the catalyst 17 are affected by heat released from the catalyst 17, that is, the element and heater temperatures increase as the catalyst temperature increases. Since the element and heater resistances change with the element and heater temperatures as indicated in FIGS. 12 and 13, respectively, the element temperature and heater temperature can be determined by detecting the element internal resistance and the heater resistance.

Figure 11:
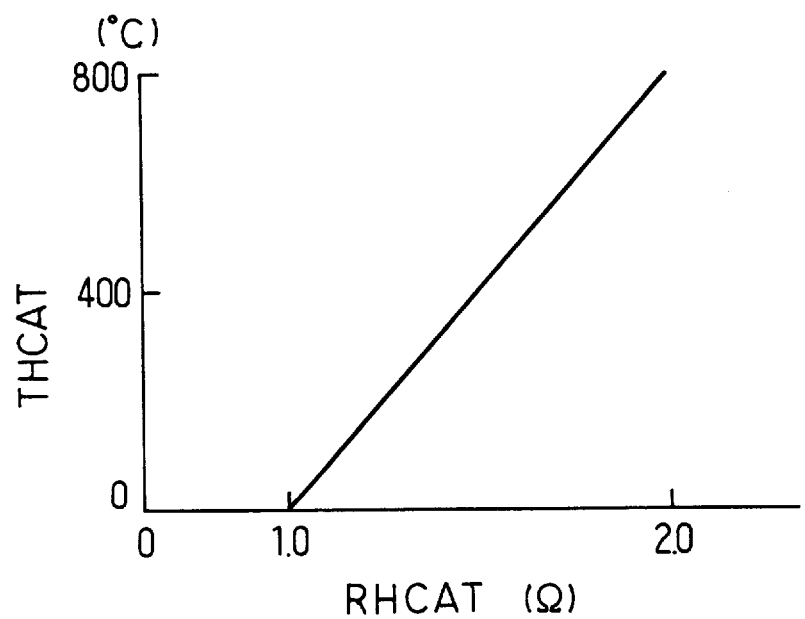
FIG. 11 is a characteristic graph indicating the relationship between the catalyst temperature THCAT and the heater resistance mean value RHCAT of the air-fuel ratio/oxygen sensor.

Referring to FIG. 10, the catalyst temperature determining method II first measures the heater resistance RHAF of the air-fuel ratio sensor 61 in step 311. Step 312 then measures the heater resistance RHO2 of the oxygen sensor 62. Step 313 calculates a weighted mean value RHCAT of the heater resistances RHAF and RHO2 using the following equation:

$$RHCAT = KAFCAT \times RHAF + (1 - KAFCAT) \times RHO2$$

where KAFCAT is a weight coefficient. Then, step 314 calculates a catalyst temperature THCAT from the heater resistance mean value RHCAT using a map as indicated in FIG. 11.

The method does not necessarily measure both the heater resistance of the air-fuel ratio sensor 61 and the heater resistance of the oxygen sensor 62, but may measure the heater resistance (or heater temperature) of only one of the sensors. The heater resistance has a linear relation with the heater temperature as shown in FIG. 13. In addition, the element internal resistance (or element temperature) may be measured instead of the heater resistance (heater temperature). The element internal resistance has a nonlinear relation with the element temperature as shown in FIG. 12. Further, both the heater resistance (heater temperature) and the element internal resistance (element temperature) may be measured to further enhance the estimation precision of the catalyst temperature THCAT.

Figure 14:
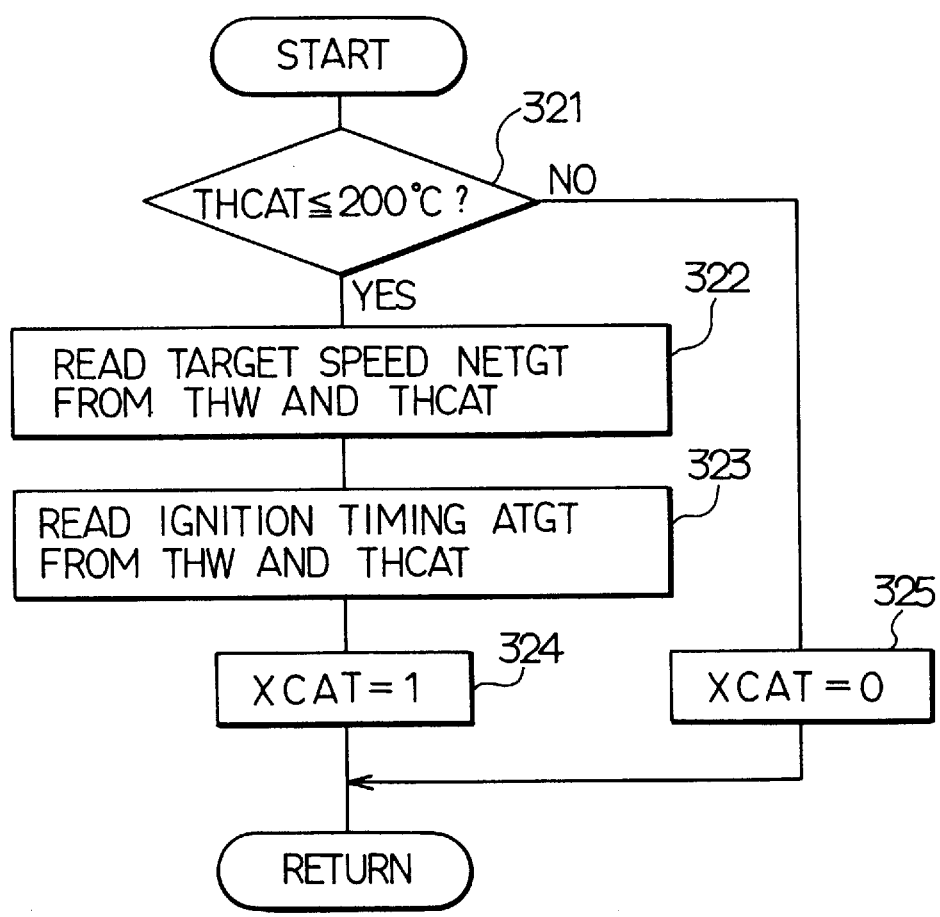
FIG. 14 is a flowchart illustrating the routine for determining whether to perform the catalyst early warm-up control.

The routine for determining whether to perform the catalyst early warm-up control will be described with reference to FIG. 14. This routine is executed only once, in the initialization process. When the routine is started, step 321 checks whether the catalyst temperature THCAT is equal to or lower than 200° C. If the catalyst temperature THCAT is higher than 200° C., in which case the catalyst early warm-up control is not needed, the operation proceeds to step 325 to set a catalyst early warm-up authorization flag XCAT to "0" indicating unauthorization. Then the routine ends.

Conversely if the catalyst temperature THCAT is 200° C. or lower, the operation proceeds to step 322 in order to execute the catalyst early warm-up control. Step 322 reads a target engine speed NETGT in accordance with the coolant temperature THW and the catalyst temperature THCAT, from the map. Step 323 then reads an ignition timing ATGT in accordance with the coolant temperature THW and the catalyst temperature THCAT, from the map. Finally, step 324 sets the catalyst early warm-up authorization flag XCAT to "1" indicating authorization. The routine then comes to an end.

Figure 15:
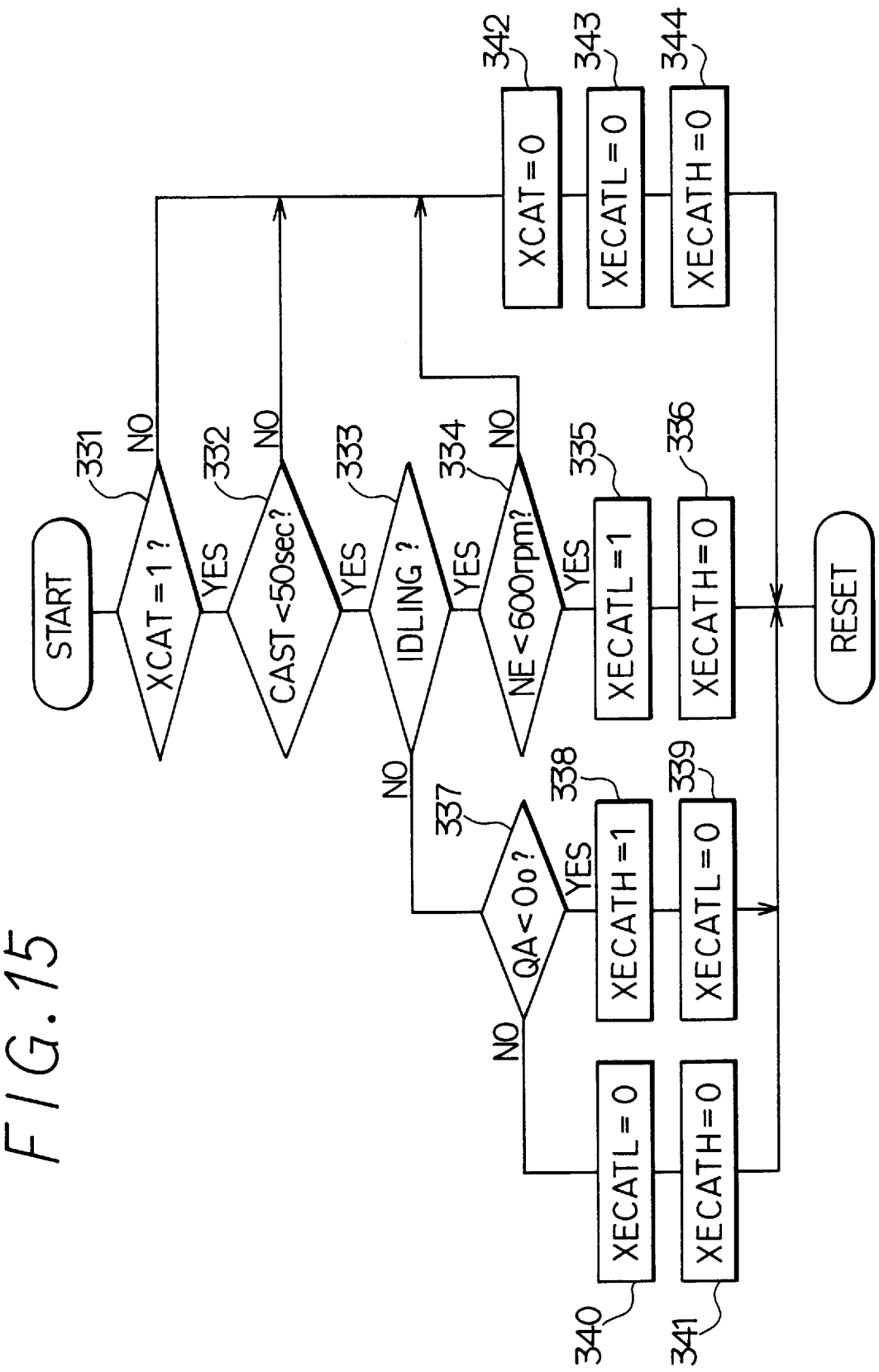
FIG. 15 is a flowchart illustrating the routine for determining whether the conditions for the catalyst early warm-up control have been established.
Figure 16:
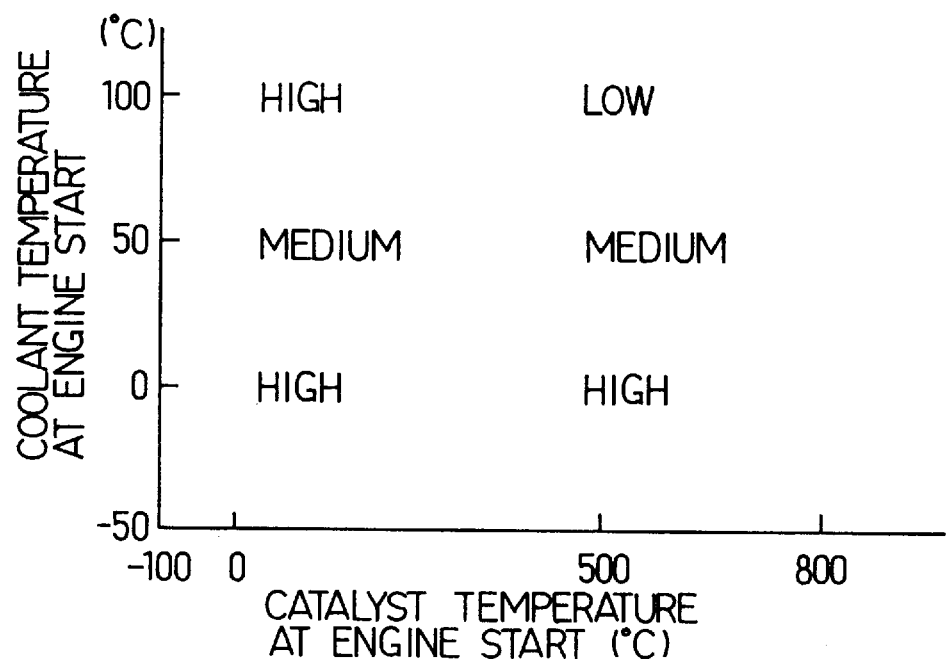
FIG. 16 is a conceptual illustration of a map for determining a target engine idle speed for the catalyst early warm-up control on the basis of the catalyst temperature and the coolant temperature at the time of start of the engine.

The routine of determining the catalyst early warm-up control conditions will be described with reference to FIG. 15. This routine is executed in a cycle of a predetermined length of time (for example, 128 ms) by interruption. When the routine is started, step 331 checks whether the catalyst early warm-up authorization flag XCAT is "1" indicating authorization. If the flag is "0" indicating unauthorization, the operation proceeds to steps 342–344 to perform the reset operation (XCAT=0, XECATL=0, XECATH=0), and the routine ends. The "XECATL" is a flag for indicating whether the catalyst early warm-up control is being executed during travel of the vehicle. The catalyst early warm-up control during travel only delays the ignition timing. The delay angle achieved during travel is less than the delay angle achieved during idling. The "XECATH" is a flag for indicating whether the catalyst early warm-up control is being executed during idling. The catalyst early warm-up control during idling delays the ignition timing and increases the target engine idle speed.

If step 331 determines that the catalyst early warm-up control authorization flag XCAT is "1" indicating authorization, the operation proceeds to step 332 to determine whether the elapsed time is less than 50 seconds. If 50 seconds or more has elapsed, in which case the catalyst early warm-up is not needed, the operation proceeds to steps 342–344 to perform the reset operation. If the elapsed time is less than 50 seconds, the operation proceeds to step 333 to determine whether the engine 11 is idling. If the engine 11 is idling, the operation proceeds to step 334 to determine whether the engine speed NE is less than 600 rpm. If it is 600 rpm or more, in which case the catalyst early warm-up control is not needed, the reset operation of steps 324–344 is performed.

If engine speed NE is less than 600 rpm, the operation proceeds to step 335 to set the during-idling catalyst early warm-up flag XECATL to "1" indicating that the during-idling catalyst early warm-up is being performed. Then step 336 sets the during-travel catalyst early warm-up flag XECATH to "0" indicating that the during-travel catalyst early warm-up is not being performed. By this operation, the during-idle catalyst early warm-up is performed by delaying the ignition timing and increasing the target engine idle speed, if the engine speed NE is less than 600 rpm. The target idle speed is set on the basis of the engine coolant temperature and the catalyst temperature at the time of start of the engine, with reference to a map indicated in FIG. 16. The target ignition timing is set on the basis of the engine coolant temperature and the catalyst temperature at the start of the engine, with reference to a map indicated in FIG. 17.

Figure 17:
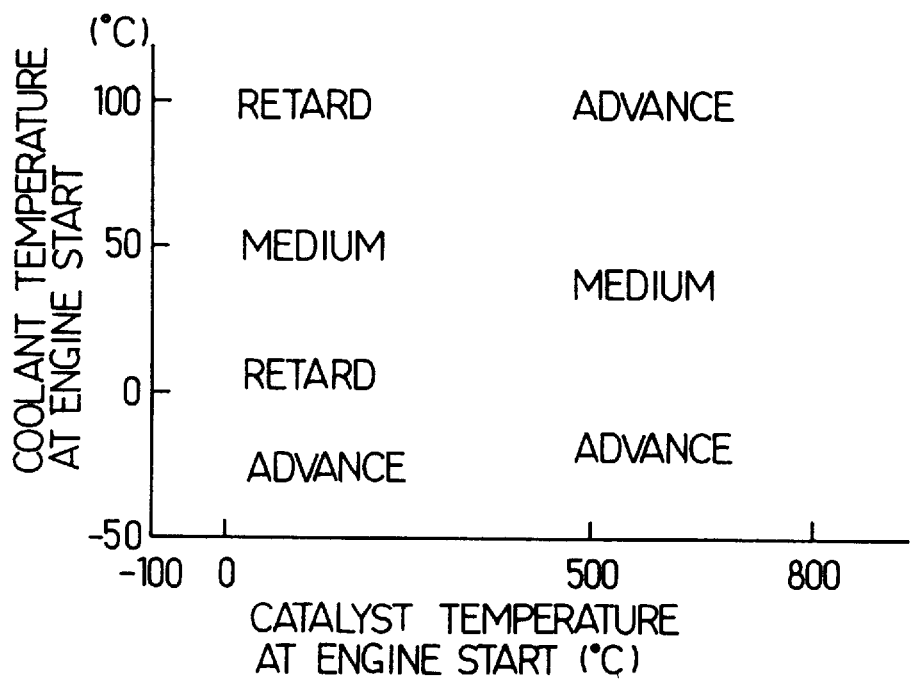
FIG. 17 is a conceptual illustration of a map for determining a target ignition timing for the catalyst early warm-up control on the basis of the catalyst temperature and the coolant temperature at the time of start of the engine.
Figure 18A:
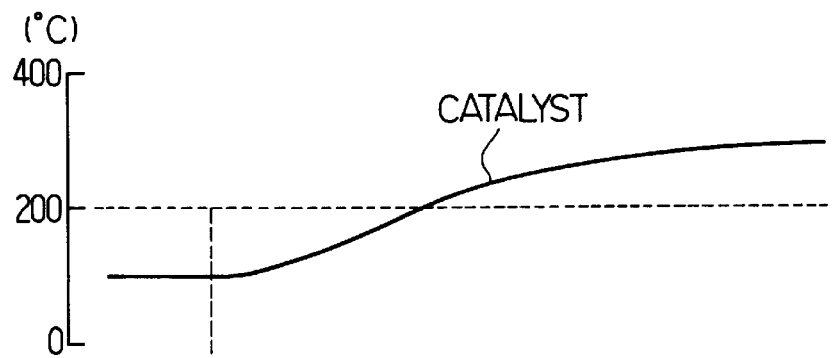
FIGS. 18A–18E show timing charts indicating the transitions caused by the catalyst early warm-up control in a case where the catalyst temperature is low but the coolant temperature is high at the time of start of the engine.
Figure 18B:
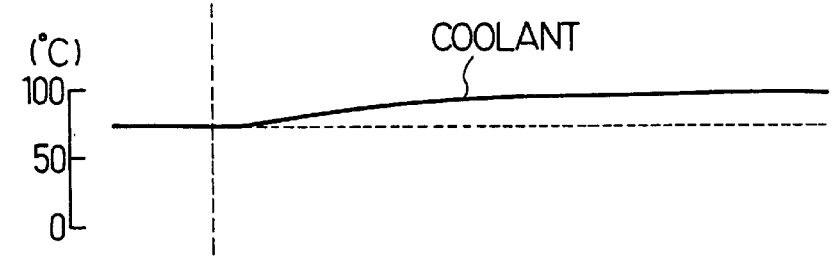
Figure 18C:
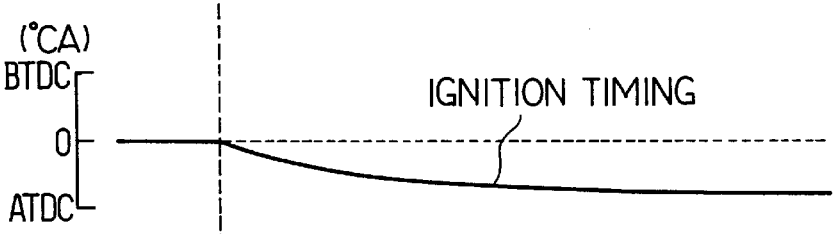
Figure 18D:
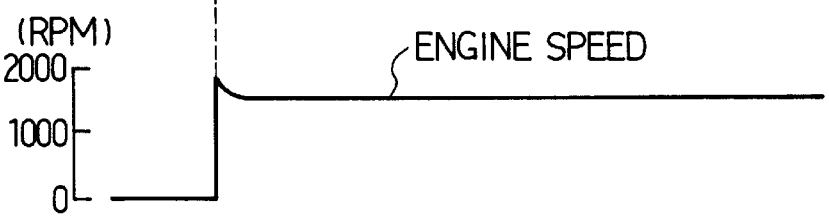
Figure 18E:
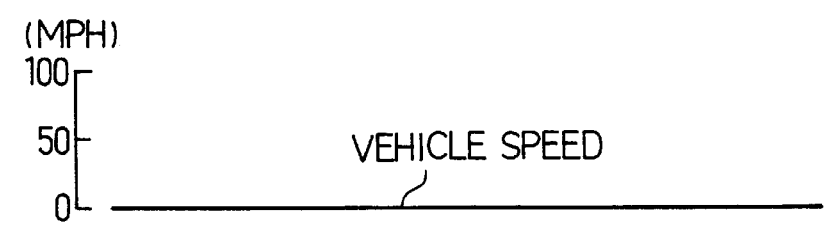
Figure 19A:
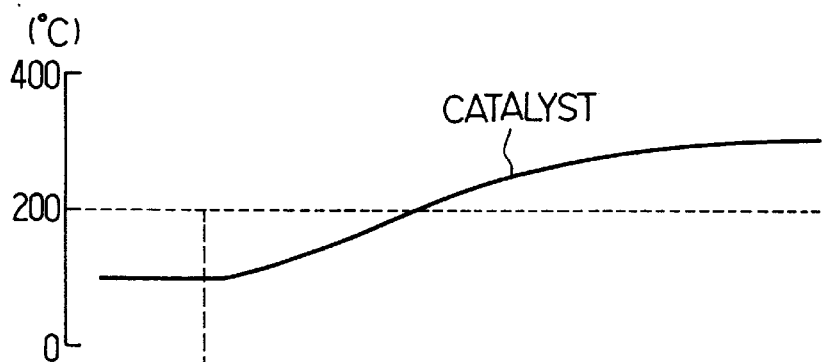
FIGS. 19A–19E show timing charts indicating the transitions caused by the catalyst early warm-up control in a case where the catalyst temperature and the coolant temperature is low at the time of start of the engine.
Figure 19B:
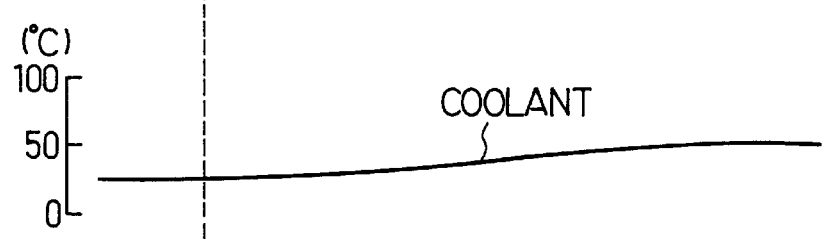
Figure 19C:
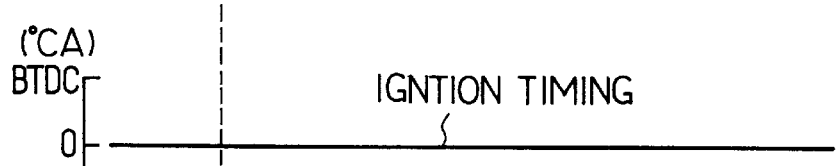
Figure 19D:
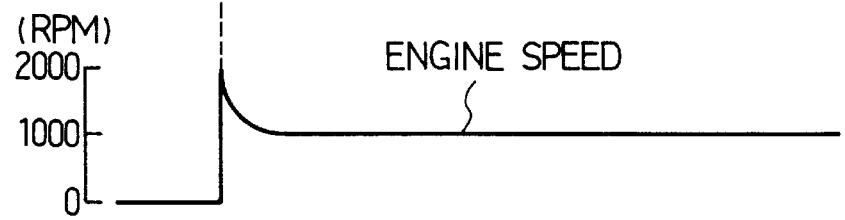
Figure 19E:
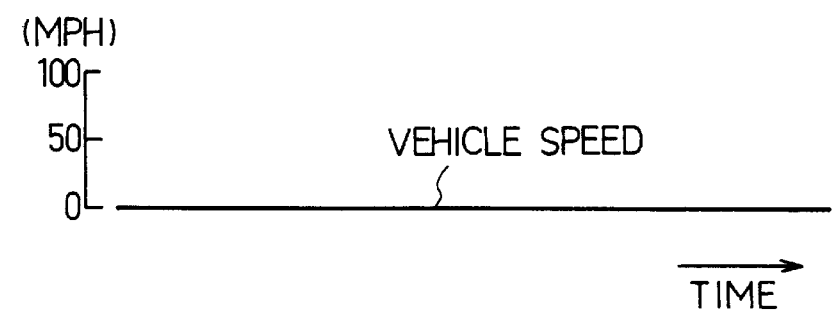

If the vehicle is traveling, the operation proceeds from step 333 to step 337 where it is determined whether the intake air flow QA is less than a predetermined value Qo. If QA<Qo, then the operation proceeds to step 338 to set the during-travel catalyst early warm-up flag XECATH to "1" indicating "being performed". Then step 339 sets the during-idling catalyst early warm-up flag XECATL to "0" indicating "not being performed". Thus, if the intake air flow QA is less than the predetermined value Qo shortly after the start of traveling, the catalyst early warm-up is performed, where only the ignition timing delay is performed. The target ignition timing used for this operation is also set with reference to the map as indicated in FIG. 17. If the intake air flow QA equals or exceeds the predetermined value Qo, the operation proceeds from step 333 to steps 340, 341 where "0" is set into both the during-idling catalyst early warm-up flag XECATL and the during-travel catalyst early warm-up flag XECATH indicating "not being operated". The catalyst early warm-up is not performed in this case.

The timing charts indicating the catalyst early warm-up control described above are shown in FIGS. 18A–18E and 19A–19E. In a case as indicated in FIG. 18 where the catalyst temperature is low and the coolant temperature is high at the time of start of the engine, the ignition timing delay angle and the target engine idle speed are increased. In another case as indicated in FIG. 19 where the catalyst temperature and the coolant temperature are low at the start of the engine, the delay (retard) angle becomes approximately zero and the target idle speed is set lower than the target idle speed set in the case indicated in FIG. 18. Thus, the catalyst early warm-up control is performed in manners suitable to the actual catalyst temperature and coolant temperature by adjusting the delay angle and the target idle speed, that is, parameters of the catalyst early warm-up control, in accordance with the catalyst temperature and the coolant temperature. The second embodiment thus warms up the catalyst 17 efficiently.

Since the second embodiment decides whether to perform the catalyst early warm-up control on the basis of the catalyst temperature, the conditions for performing the catalyst early warm-up control are established so that the control is actually performed if the catalyst is cold at the time of start of the engine, regardless of whether the coolant temperature is high or low. Thus, the embodiment reduces harmful exhaust gas components immediately after the engine is started.

Although the second embodiment variably adjusts the delay angle and the target idle speed in accordance with catalyst temperature and the coolant temperature for the catalyst early warm-up control, the execution time of the catalyst early warm-up control may also be adjusted.

For the catalyst early warm-up control, technologies other than disclosed above may be employed, for example, EGI (glow plug), dither control (±10% adjustment of the fuel injection amount), misfire control, EHC (catalyst with a heater), etc.

As understood from the above description, according to the first aspect of the invention, the exhaust damper for opening and closing an exhaust passage is provided upstream and/or downstream of the catalyst disposed in the exhaust passage so that the exhaust damper is opened or closed under certain conditions after the engine is stopped. Thereby, the heat release from the catalyst after stop of the engine is reduced so that the catalyst can be soon brought to an activation temperature when the engine is restarted. Since good exhaust gas purification is thus performed immediately after restart of the engine, harmful exhaust gas components can be reduced immediately after start of the engine.

In addition, since the exhaust damper is closed for a predetermined length of time after stop of the engine if the catalyst is activated, the exhaust damper can be reliably closed when the catalyst warmth keeping operation is necessary or useful.

Furthermore, since the exhaust damper is opened simultaneously with restart of the internal combustion engine if the restart is performed while the exhaust damper is closed, it is ensured that the exhaust damper will be opened after the engine is restarted, thus preventing the exhaust damper from impeding the flow of exhaust gas.

Since the operating pressure on the drive mechanism for the exhaust damper is gradually attenuated while the exhaust pipe is closed so that the exhaust damper will be opened by spring force when the operating pressure becomes less than the spring force, the exhaust damper can be automatically opened by the spring force at least a predetermined length of time after the exhaust damper has closed. Besides, the spring force will reliably open the exhaust damper even if a failure occurs in an electric system, thus further improving the fail-safety characteristics.

According to the second embodiment of the invention, since it is decided whether to perform the catalyst early warm-up control on the basis of the catalyst temperature, the catalyst early warm-up control is performed if the catalyst is cold at the time of restart of the engine regardless of whether the engine coolant temperature is high or low. Thus, the catalyst early warm-up control is performed without fail when needed.

Since parameters of the catalyst early warm-up control are variably adjusted in accordance with the catalyst temperature, the catalyst early warm-up control can be performed in manners suitable to the catalyst temperature, thus achieving efficient warm-up of the catalyst.

Furthermore, since parameters of the catalyst early warm-up control are corrected in accordance with the coolant temperature of an internal combustion engine, highly precise catalyst early warm-up control can be performed taking into account the coolant temperature as well.

In addition, since the catalyst temperature is estimated on the basis of the coolant temperature of the internal combustion engine and the duration of an engine stoppage, the catalyst temperature can be estimated without requiring a temperature sensor provided specifically for detecting the catalyst temperature.

Further, since the catalyst temperature is estimated on the basis of at least one of the element temperature and the heater temperature of the air-fuel ratio sensor disposed near the catalyst, the catalyst temperature can be estimated without requiring a temperature sensor provided specifically for detecting the catalyst temperature.

While the present invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims.

What is claimed is:

1. An internal combustion engine exhaust gas purifying apparatus comprising:

exhaust closing means provided in an exhaust passage of an internal combustion engine having a catalyst for purifying exhaust gas, for opening and closing the exhaust passage;

catalyst state detecting means for detecting a state of the catalyst; and drive means for closing the exhaust passage by using the exhaust closing means after the internal combustion engine has stopped, on the basis of the state of the catalyst detected by the catalyst state detecting means.

2. An internal combustion engine exhaust gas purifying apparatus according to claim 1, wherein:

the catalyst state detecting means determines whether the catalyst is activated; and the drive means closes the exhaust passage if the catalyst state detecting means determines that the catalyst is activated.

3. An internal combustion engine exhaust gas purifying apparatus according to claim 1, wherein:

the drive means includes means for opening the exhaust passage if operation for restarting the internal combustion engine is performed while the exhaust passage is closed.

4. An internal combustion engine exhaust gas purifying apparatus according to claim 1, wherein:

the drive means includes means for, if the exhaust passage is closed after the internal combustion engine has stopped, opening the exhaust passage when at least a predetermined length of time elapses after the internal combustion engine has stopped.

5. An internal combustion engine exhaust gas purifying apparatus according to claim 1, wherein:

the drive means includes pressure means for producing a drive force in a closing direction by using an operating pressure from a pressure source and for producing a drive force in an opening direction by using a spring force, the pressure means gradually attenuating the operating pressure while the exhaust passage is closed, and the pressure means allowing the spring force to open the exhaust closing means when the operating pressure becomes less than the spring force.

6. An internal combustion engine exhaust gas purifying apparatus comprising:

catalyst early warm-up means for, after an internal combustion engine is started, performing catalyst early warm-up control to quickly increase temperature of a catalyst provided in an exhaust passage of the internal combustion engine;

catalyst temperature detecting means for detecting temperature of the catalyst; and catalyst early warm-up deciding means for deciding whether to perform the catalyst early warm-up control by the catalyst early warm-up means on the basis of the temperature of the catalyst;

wherein the catalyst early warm-up means calculates a parameter of the catalyst early warm-up control in accordance with the catalyst temperature detected by the catalyst temperature detecting means.

7. An internal combustion engine exhaust gas purifying apparatus comprising:

catalyst early warm-up means for, after an internal combustion engine is started, performing catalyst early warm-up control to quickly increase temperature of a catalyst provided in an exhaust passage of the internal combustion engine;

catalyst temperature detecting means for detecting temperature of the catalyst; and catalyst early warm-up deciding means for deciding whether to perform the catalyst early warm-up control by the catalyst early warm-up means on the basis of the temperature of the catalyst;

wherein the catalyst temperature detecting means estimates a catalyst temperature on the basis of coolant temperature of the internal combustion engine and duration of stoppage of the internal combustion engine.

8. An internal combustion engine exhaust gas purifying apparatus comprising:

catalyst early warm-up means for, after an internal combustion engine is started, performing catalyst early warm-up control to quickly increase temperature of a catalyst provided in an exhaust passage of the internal combustion engine;

catalyst temperature detecting means for detecting temperature of the catalyst; and catalyst early warm-up deciding means for deciding whether to perform the catalyst early warm-up control by the catalyst early warm-up means on the basis of the temperature of the catalyst;

wherein the catalyst temperature detecting means estimates a catalyst temperature on the basis of at least one of element temperature and heater temperature of an air-fuel ratio sensor disposed on at least one of upstream side and downstream side of the catalyst.

9. A method for purifying internal combustion engine exhaust gas, said method comprising:

after an internal combustion engine is started, performing catalyst early warm-up control to quickly increase temperature of a catalyst provided in an exhaust passage of the internal combustion engine;

detecting temperature of the catalyst; and determining whether to perform the catalyst early warm-up control based on the temperature of the catalyst;

wherein the determining step includes calculating a parameter of the catalyst early warm-up control in accordance with the detected catalyst temperature.

10. A method for purifying internal combustion engine exhaust gas, said method comprising:

after an internal combustion engine is started, performing catalyst early warm-up control to quickly increase temperature of a catalyst provided in an exhaust passage of the internal combustion engine;

detecting temperature of the catalyst; and determining whether to perform the catalyst early warm-up control based on the temperature of the catalyst;

wherein the detecting step includes estimating a catalyst temperature based on coolant temperature of the internal combustion engine and duration of engine stoppage.

11. A method for purifying internal combustion engine exhaust gas, said method comprising:

after an internal combustion engine is started, performing catalyst early warm-up control to quickly increase temperature of a catalyst provided in an exhaust passage of the internal combustion engine;

detecting temperature of the catalyst; and determining whether to perform the catalyst early warm-up control based on the temperature of the catalyst;

wherein the detecting step includes estimating a catalyst temperature based on at least one of element temperature and heater temperature of an air-fuel ratio sensor disposed on at least one of an upstream side and downstream side of the catalyst.

12. A method for purifying internal combustion engine exhaust gas with a catalyst in an exhaust passage, said method comprising:

detecting a state of the catalyst; and closing the exhaust passage after the internal combustion engine has stopped based on the detected state of the catalyst.

13. A method as in claim 12 wherein:

the detecting step includes determining whether the catalyst is activated; and the closing step is performed if the catalyst is detected as being activated.

14. A method as in claim 12 further comprising:

opening the exhaust passage if operation for restarting the internal combustion engine is performed while the exhaust passage is closed.

15. A method as in claim 12 further comprising:

if the exhaust passage is closed after the internal combustion engine has stopped, opening the exhaust passage when at least a predetermined length of time elapses after the internal combustion engine has stopped.

16. A method as in claim 12 wherein said closing step comprises:

producing a drive force in a closing direction by using an operating pressure from a pressure source, and producing a drive force in an opening direction by using a spring force, the pressure means gradually attenuating the operating pressure while the exhaust passage is closed, and the pressure means allowing the spring force to open the exhaust closing means when the operating pressure becomes less than the spring force.

* * * * *